United States Patent [19]

Thiele et al.

[11] 4,115,007
[45] Sep. 19, 1978

[54] VEHICLE WHEEL ALIGNMENT SYSTEM

[75] Inventors: Carl L. Thiele, Pasadena; Haskell Shapiro, Corona del Mar, both of Calif.

[73] Assignee: Royal Industries, Inc., Osseo, Minn.

[21] Appl. No.: 648,890

[22] Filed: Jan. 14, 1976

[51] Int. Cl.² .................................. G01B 11/275
[52] U.S. Cl. ................................................ 356/155
[58] Field of Search ....................................... 356/155

[56] References Cited

U.S. PATENT DOCUMENTS 3,804,526   4/1974   McKenney ........................ 356/155
3,918,814  11/1975   Weiser .............................. 356/138

OTHER PUBLICATIONS

Monsanto: Solid State Optoelectronics, Short Form Catalog., Mar. 19, 1974, p. 6

Primary Examiner—John K. Corbin
Assistant Examiner—R. A. Rosenberger
Attorney, Agent, or Firm—Warren A. Sturm

[57] ABSTRACT

An electro-optical wheel alignment system for vehicles includes a coaxially disposed radiant energy source and detector in which the source and detector are axially spaced apart and the source is physically small and provides a modulated output. The source and detector are adjustably disposed on the component of an automobile to be positioned in a predetermined attitude with respect to a reference device that is, in turn, positioned in a predetermined attitude with respect to the vehicle, such device comprising a radiant energy reflecting planar surface.

29 Claims, 11 Drawing Figures

VEHICLE WHEEL ALIGNMENT SYSTEM

BACKGROUND OF THE INVENTION

Our invention relates to the general type of wheel alignment apparatus disclosed in U.S. Pat. No. 3,804,526, issued Apr. 16, 1974 and assigned to Royal Industries, Inc., the assignee of this application.

In the prior art with which our invention is concerned, it has been determined that the use of an adjustable reflective reference surface and a source and detector for transmitting radiant energy to the reflective reference and detecting energy received back from the reference can be a versatile and useful tool in adjusting the attitude of the axes of revolution of wheels on a vehicle with respect to one or more reference axes of the vehicle. This may also be seen in a copending application, Ser. No. 409,134, filed Oct. 24, 1973, now U.S. Pat. No. 3,963,352 for WHEEL ALIGNMENT APPARATUS, also assigned to the assignee of our invention, together with the patent referred to above, illustrate a progression of improvements that have been necessitated to overcome inefficiencies, high cost or the like, of prior art apparatus and systems.

BRIEF SUMMARY OF THE INVENTION

It will be seen that our invention includes coaxially oriented sources and sensors that are axially spaced apart and configured so as to provide an infinitely small source of radiant energy having a low angle divergent beam that is projected toward a reflecting reference planar surface which directs the beam back toward the source and to the axially spaced detector. Further, the system of our invention includes a means in the form of a gravity operated device, such as a level that is disposed on a mounting means for the source of energy and the sensor to guide an operator into positioning the mounting means on a component of a vehicle in operating relationship with the reference plane. A suitable indicator is provided to tell the operator when this relationship has been established. The size of the source of radiant energy is very small, so that the problem of varying intensity over the effective area thereof, a difficulty experienced with prior art systems of this type, to eliminate errors and inaccuracies normally found in the general class of systems of this class. The size and form of the detector compliment the characteristics of the source of energy to provide a synergistic effect not attained in the prior art.

The system further includes a form of modulation for the source of energy and a synchronous detection of the reflected energy which results in a highly accurate operation and converts the reflected energy to an electrical signal that may effectively be displayed to an operator.

BRIEF SUMMARY OF THE DRAWINGS

FIG. 5 is a sectional elevational view taken along section line 5—5 in FIG. 2;

DESCRIPTION OF THE ILLUSTRATED EMBODIMENT

Figure 1:
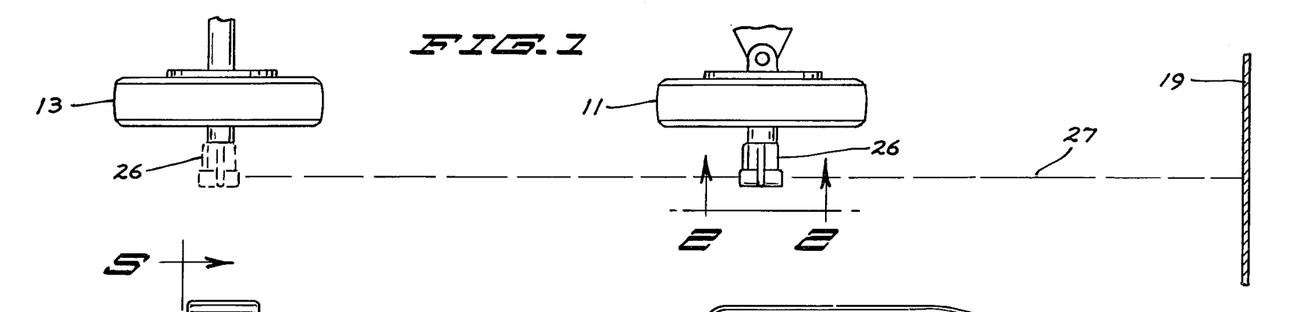
FIG. 1 is a plan view of selected portions of a wheel alignment system incorporating the principles of our invention, substantially all of a vehicle being omitted.
Figure 2:
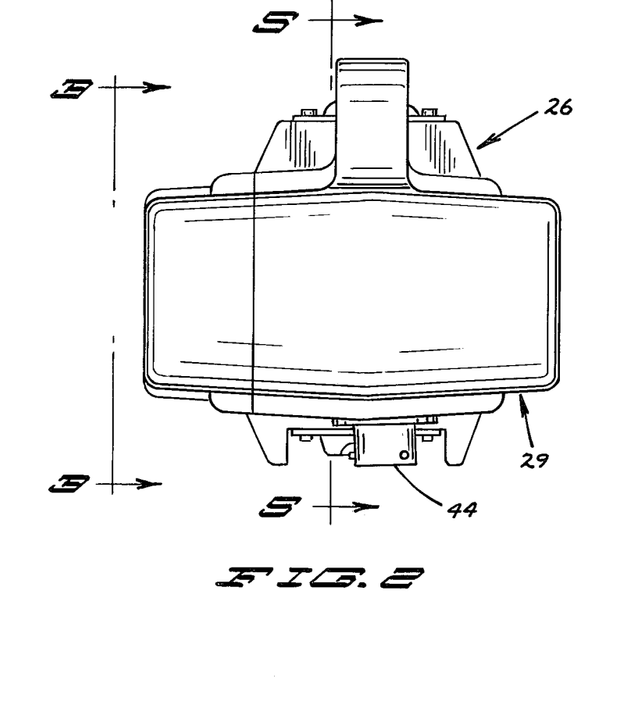
FIG. 2 is an enlarged side elevational view of a portion of our apparatus taken along section lines 2—2 on FIG. 1 of the drawings.
Figure 3:
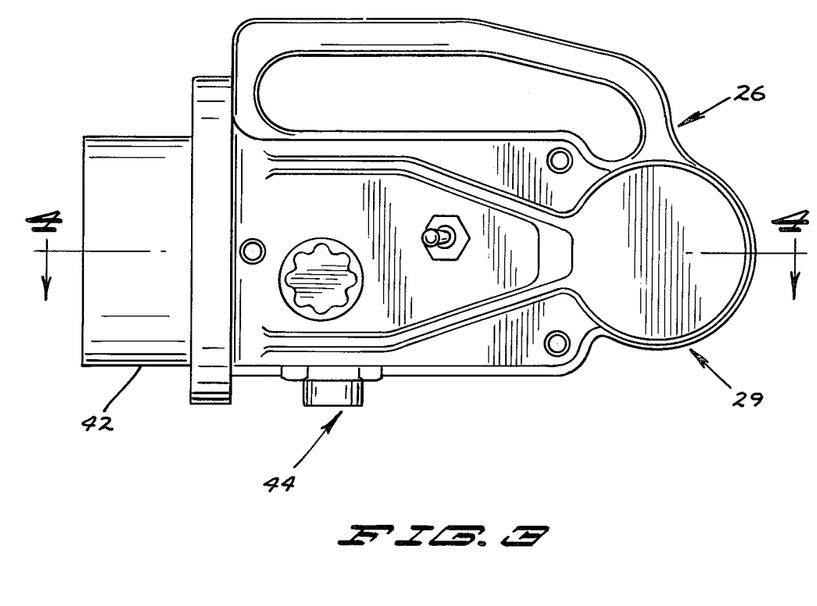
FIG. 3 is a rear elevational view of the apparatus shown in FIG. 2 taken along section line 3—3.
Figure 7:
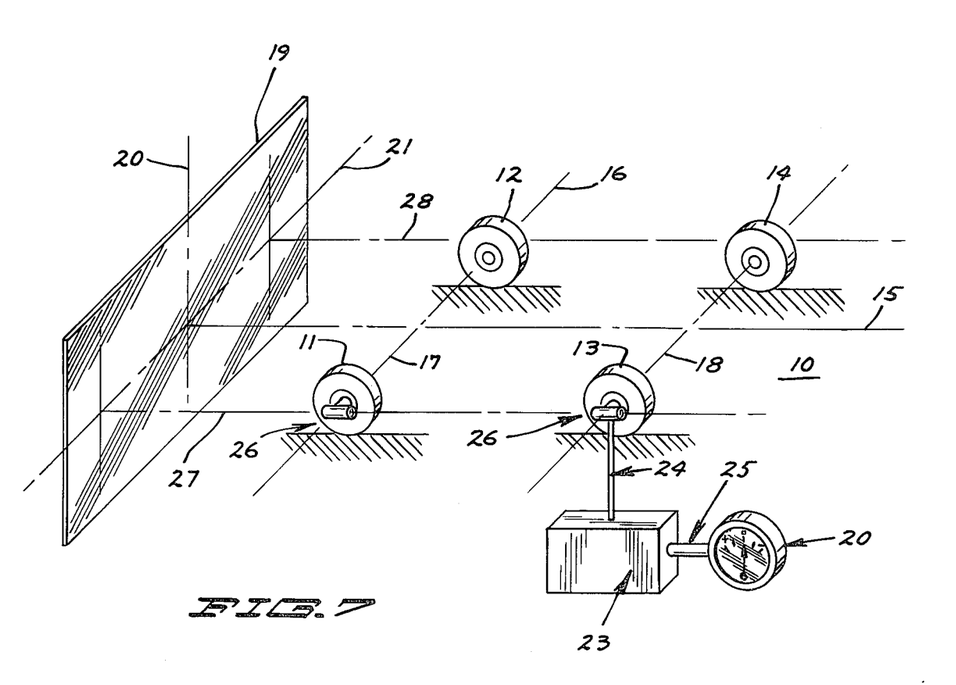
FIG. 7 is a schematic and diagrammatic sketch of a wheel alignment apparatus and method embodying the principles of our invention.

Referring now to FIGS. 1 and 7 of the drawings, a representation of a system for aligning the wheels of an automobile is illustrated in schematic and diagrammatic form. In such a system, a vehicle (not shown) having a plurality of wheels, 11, 12, 13 and 14, is normally disposed on a work surface 10 as illustrated schematically under each of the wheels. Surface 10 is normally horizontal and substantially planar in configuration.

A reflecting surface, such as a mirror, is indicated by reference character 19 and includes a vertical axis and a horizontal axis 21. Vertical axis 20 is normally disposed at an attitude that is normal to the surface of plane 10.

When a vehicle is disposed with the wheels shown as illustrated in FIG. 7, the steerable front wheels 11 and 12 are normally disposed in proximity to mirror or reflective surface 19. A longitudinal axis of a vehicle is illustrated by reference character 15 and, under usual circumstances, the front wheels are to be aligned or disposed with their axes 17 and 16 in a predetermined attitude with respect to longitudinal axis 15 of the vehicle.

In order to properly calibrate the system, a common procedure is to align mirror 19 so that its plane is parallel to the axis, 18, of rear wheels 13 and 14. This may be done by rotating mirror 19 about its vertical axis 20 while maintaining mirror 19 in a vertical attitude with respect to its horizontal axis 21. This may be done by placing a device comprising a wheel head 26 and an indicating meter 20 as well as a control apparatus 23, each interconnected through appropriate cables 24 and 25, for determining the attitude of mirror 19 with respect to the plane of rotation of one of the rear wheels, shown on wheel 13 that is assumed to be perpendicular to axis 18. This may conveniently be done by applying the principles of our invention, as will be described below, to an optical-electric apparatus which is contained, in the illustrated embodiment, in a housing on a device that is adapted to be disposed on the wheels of a vehicle so that an optical axis, as indicated on FIGS. 1 and 7 by reference character 27, is positioned in a predetermined attitude with respect to the longitudinal axis 15 of a vehicle. When it has been determined that mirror 19 is perpendicular, or normal, to optical axis 27, the wheel head 26 is then disposed on front wheel 11 for further measuring and/or adjustment of the attitude of axis 17 of wheel 11 with respect to longitudinal axis 15 because the attitude of mirror 19 has been adjusted to provide a reference reflective surface from which, as will be described below in connection with the operation of our system involving wheel head 26, may then be utilized as a reference to either determine the attitude of the axis 17 of wheel 11 or to assist in rendering an indication of the desired predetermined relationship of axis 17 with respect to axis 15.

As will be set forth in greater detail below, the means for establishing optical axis 27 may be seen to include a source of suitably modulated infrared radiant energy, 37, which is directed toward mirror 19. The reflected energy therefrom is focused by suitable means to impinge upon a detector 35 that is disposed coaxially of and axially spaced apart of the source of radiant energy 37. Detector 35 and source 37 are positioned and configured to operate as an optical lever and therefore may be utilized to indicate the degree of departure of coaxialism of the optical axes of the radiant source and detector so that upon disposition of wheel head 26 on a wheel in a known relationship with respect to its axis of rotation, the degree of departure of the axis of the wheel from a predetermined desired attitude may easily be determined and interpreted by an operator to allow him to make the necessary adjustments on the mounting for the wheel so as to effect proper alignment for optimum operability of the vehicle supported by such wheel.

Referring to FIGS. 2, 3, 4, 5 and 6 of the drawings, a wheel head, 26, is illustrated as having a generally elongated housing with an appropriate handle to facilitate use extending longitudinally of the housing, and a wheel engaging end 42 that includes a magnet that is adapted to engage and hold wheel head 26 on a suitable reference surface on a wheel, such as a hub or other surface lying in a plane that is parallel to the axis of rotation of the wheel. Portion 42 of wheel head 26 may be comprised of, for example, apparatus like or similar to that shown in U.S. Pat. No. 3,171,208, issued Mar. 2, 1965 to Baxter Bender. Wheel head 26 further includes, at its outer end, a tubular portion indicated generally by reference character 29 which will be described in detail below. The longitudinal axis of tubular portion 29 may also be seen to constitute the optical axis 27 of wheel head 26, as referred to above, and is configured to have a perpendicular or normal attitude with respect to the longitudinal axis (not shown) of wheel head 26. At this point, it may be helpful to understand that the longitudinal axis of wheel head 26 may be disposed parallel to the axis of rotation of a wheel or, through suitable adjustment of the wheel engaging end 42, it may be adjusted through a range of non-parallel attitudes with respect to the axis of the wheel, the attitude of which is to be adjusted or measured. Wheel head 26 may also be provided with suitable level indicating means (not shown) as may be seen in the last above referred to U.S. Pat. No. 3,171,208 so as to facilitate operation with the optical axis, 27, generally parallel to the plane of work surface 10.

Element 29 on wheel head 26 includes a cylindrical outer tube 30 having a front end 33 and a coaxially disposed inner tube 31 which, in turn, carries, through spider members 36, a coaxially disposed central tube 32. A sensor, the details of which will be set forth below, is suitably disposed at the optical axis 27 near the rear end 34 of cylindrical outer tube 30. A source of radiant energy 37 is shown disposed coaxially of central tube 32 and is directed toward the front end 33 of outer tube 30. A small biconvex lens 41 is disposed on the front of central tube 32 to suitably focus a beam of radiant energy as emitted by radiant energy source 37. A larger biconvex lens 40 is shown disposed on top of inner cylindrical tube 31 and in proximity to the front end of cylindrical outer tube 30 so as to focus radiant energy rays, 39, returning from a reflective surface such as mirror 19, toward detector 35. It may be noted that the source of radiant energy 37 and detector 35 are axially spaced apart along the optical axis of portion 29 of wheel head 26 and, for the illustrative embodiment, are disposed so that their axis, optical axis 27, is in a generally horizontal or parallel attitude with respect to horizontal work surface 10. It may further be noted, as illustrated in FIG. 6 of the drawings, that the optical properties of lenses 40 and 41 and the position of radiant energy source 37 on optical axis 27 are such that the emitted radiation, indicated generally by reference character 38, is of a slightly divergent nature so that when the optical axis 27 is normal to the plane of mirror 19, reflected rays indicated generally by reference character 39, are impingent on the larger lens 40 and thereby refocused to impinge upon a reflected image plane, indicated by the letter I on FIG. 6, whereby they may be sensed by detector 35 to determine the desired coaxialism or to indicate the degree of departure from a desired coaxial attitude as determined by the geometries and adjustment of wheel engaging end 42 on wheel head 26.

Figures 4, 9A, 9B:
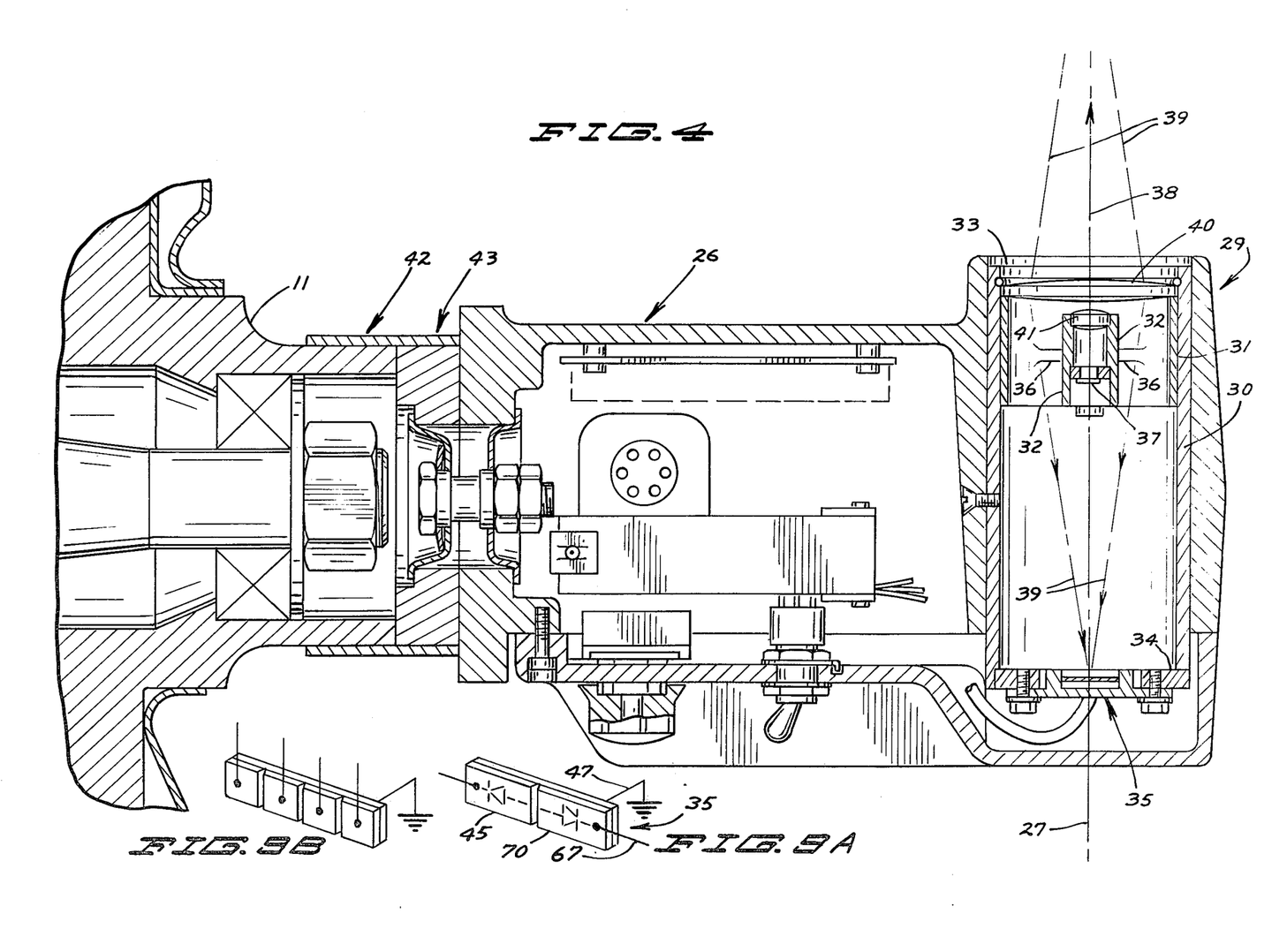
FIG. 4 is an enlarged sectional plan view of FIG. 3 taken along section line 4—4.
FIGS. 9A and 9B are perspective views of detector-transducers for use in our system.

Detector 35 may conveniently be configured as in the illustration of FIG. 9A which shows a metallic base with appropriate light sensitive material disposed in two spaced apart discrete sections indicated by reference characters 45 and 70 to illustrate graphically and schematically the relative disposition of the radiant energy responsive diodes 45 and 70 in relation to the actual physical configuration of detector 35. Detector 35 is shown formed of a base of conductive metal that is grounded, as shown, through conductor 47 and has two or more discrete spaced apart sections of radiant energy responsive material to which conductors are attached by suitable means, such as welding or the like. The separate sections of detector 35 are shown spaced apart along its axis 67 which, in the illustrated embodiment, would normally lie in a generally horizontal relationship with respect to the plane of work surface 10. FIG. 9B illustrates a further detector which may be comprised of a like material and which affords a greater latitude for a particular system and is dependent upon the goemetries and the range of scale for the particular operation. Sensor or detector 35 is also referred to as a multi- or bi-cell photodetector dependent upon the number of elements that are active and utilized in a system.

Figure 6:
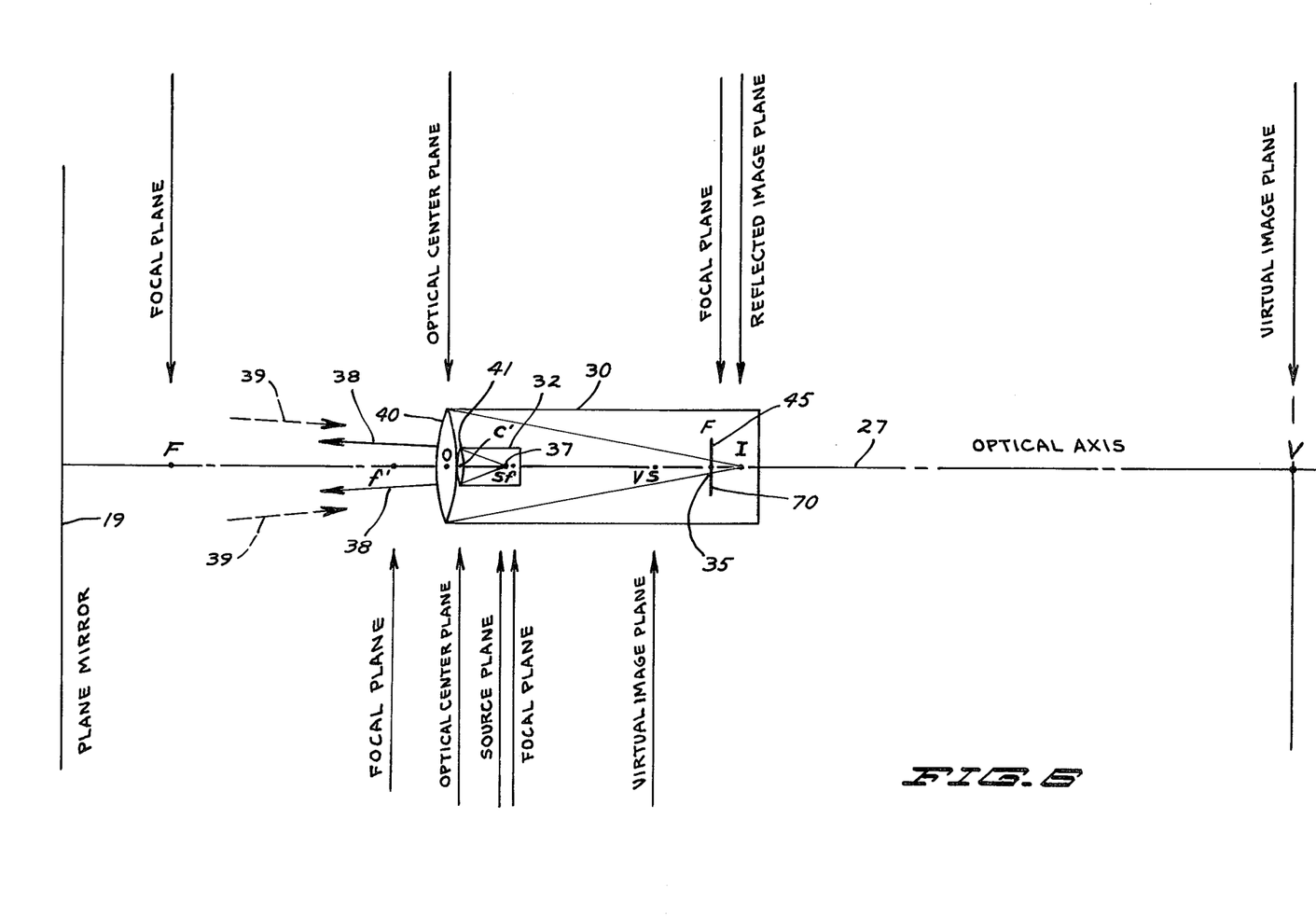
FIG. 6 is a sketch illustrating the operation of a portion of the apparatus shown in FIGS. 1-5.

Referring now to FIG. 6, an optical diagram is utilized to illustrate the relative positions of the elements used in the illustrated embodiment. It may be noted that biconvex lenses 40 and 41 are disposed at one end of cylindrical outer tube 30 having an optical axis 27. The focal planes of large lens 40 are indicated by the letters F, F', while the focal planes for the small lens 41 are indicated by $f$, $f'$, and it may be seen that reflective mirror surface 19 is also shown in the form of a plane that is at some distance in front of the focal plane F' of large lens 40. The virtual image plane, V, for large lens 40 is shown well to the right of detector 35 and the virtual image plane, vs, for small lens 41. A reflected image plane indicated by I indicates the disposition of the focused reflected image and it will be noted that the image appearing at detector 35 will be slightly defocused and somewhat larger in size than that which would obtain without a defocusing of the reflected image so as to provide a somewhat larger reflected image for coaction with the elements of detector 35 in the illustrated embodiment. It may also be noted that source of radiant energy 37, indicated by small s on FIG. 6, is placed somewhat ahead of the focal plane, f, of small lens 41 so as to provide a slightly divergent beam of radiant energy shown in the form of the arrows to which reference character 38 has been applied. The reflected image rays are indicated by reference character 39. It should also be understood that the illustration of FIG. 6 is a top view in which detector 35 would be mounted in a generally horizontal attitude with respect to the plane of work surface 10 with photodiodes 45 and 70 on either side of optical axis 27. It may also be appreciated that the relative distance between tube 30 and reflective surface 19 may vary considerably when moving the unit of wheel head 26 from a front to a rear wheel when applying the principles of my system to the calibration of the running gear of a vehicle.

Figure 8:
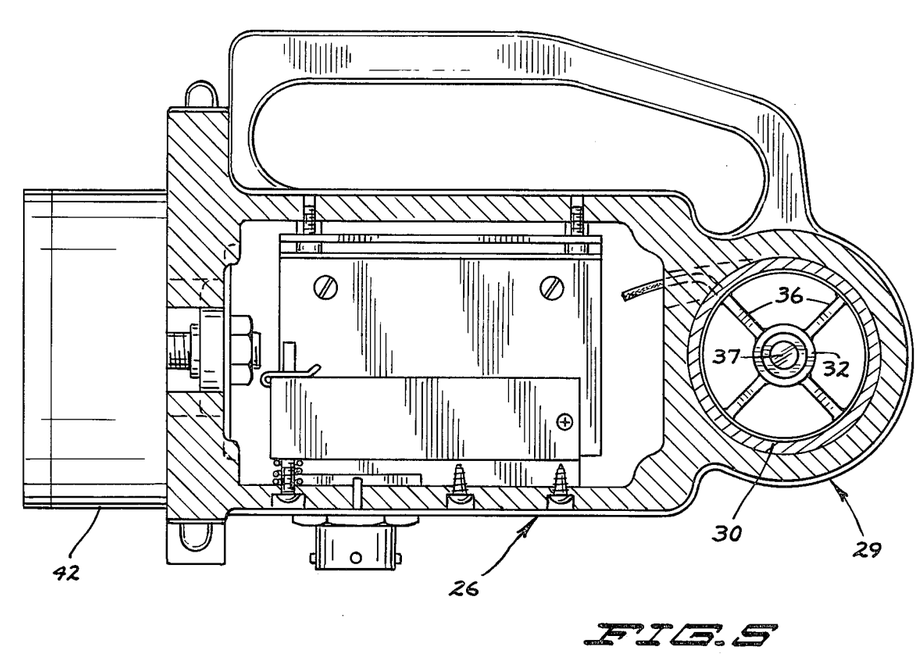
FIGS. 8A and 8B are a schematic and diagrammatic drawing illustrating the electrical functions performed by the apparatus of our invention.
Figure 8B:
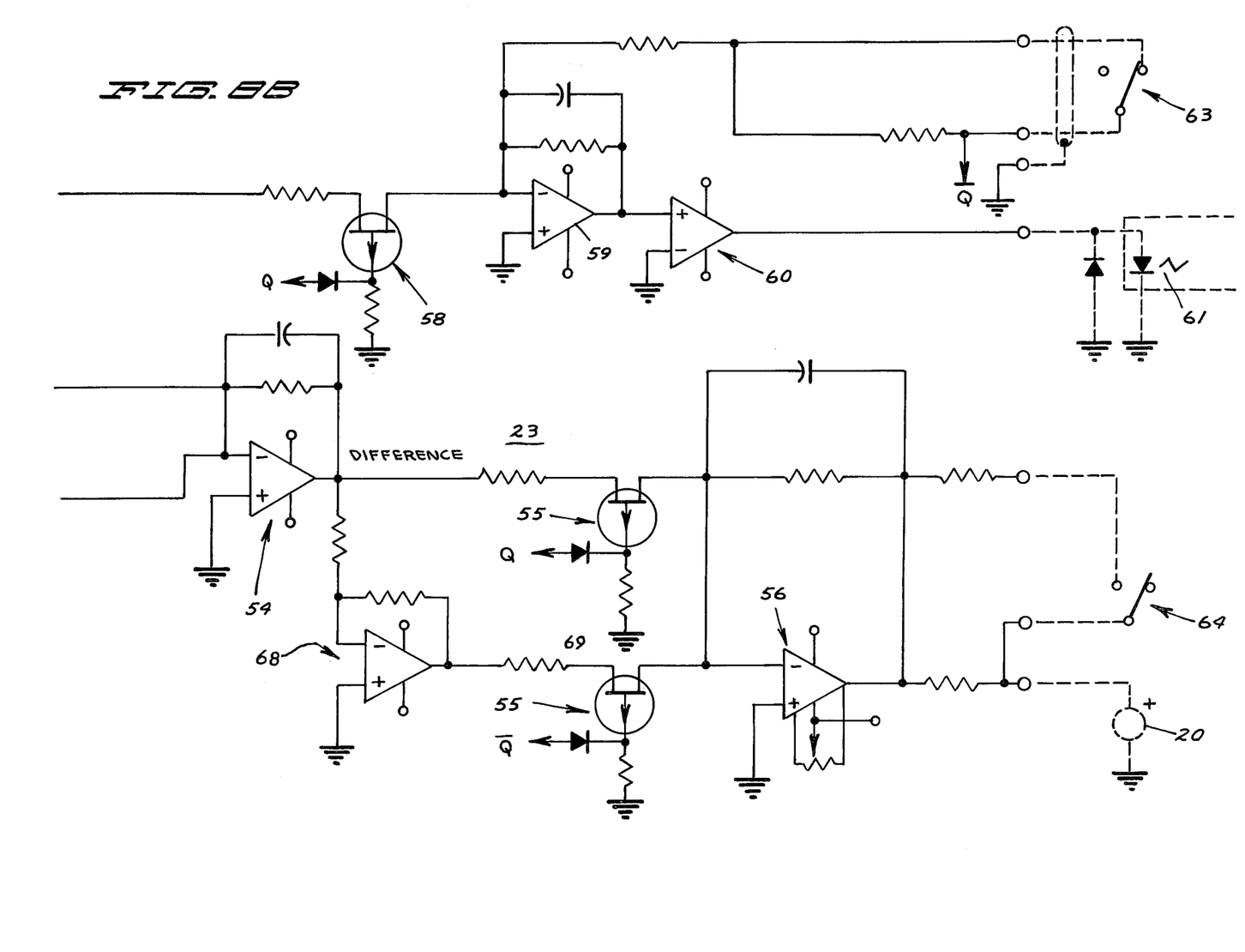
Figure 9A:
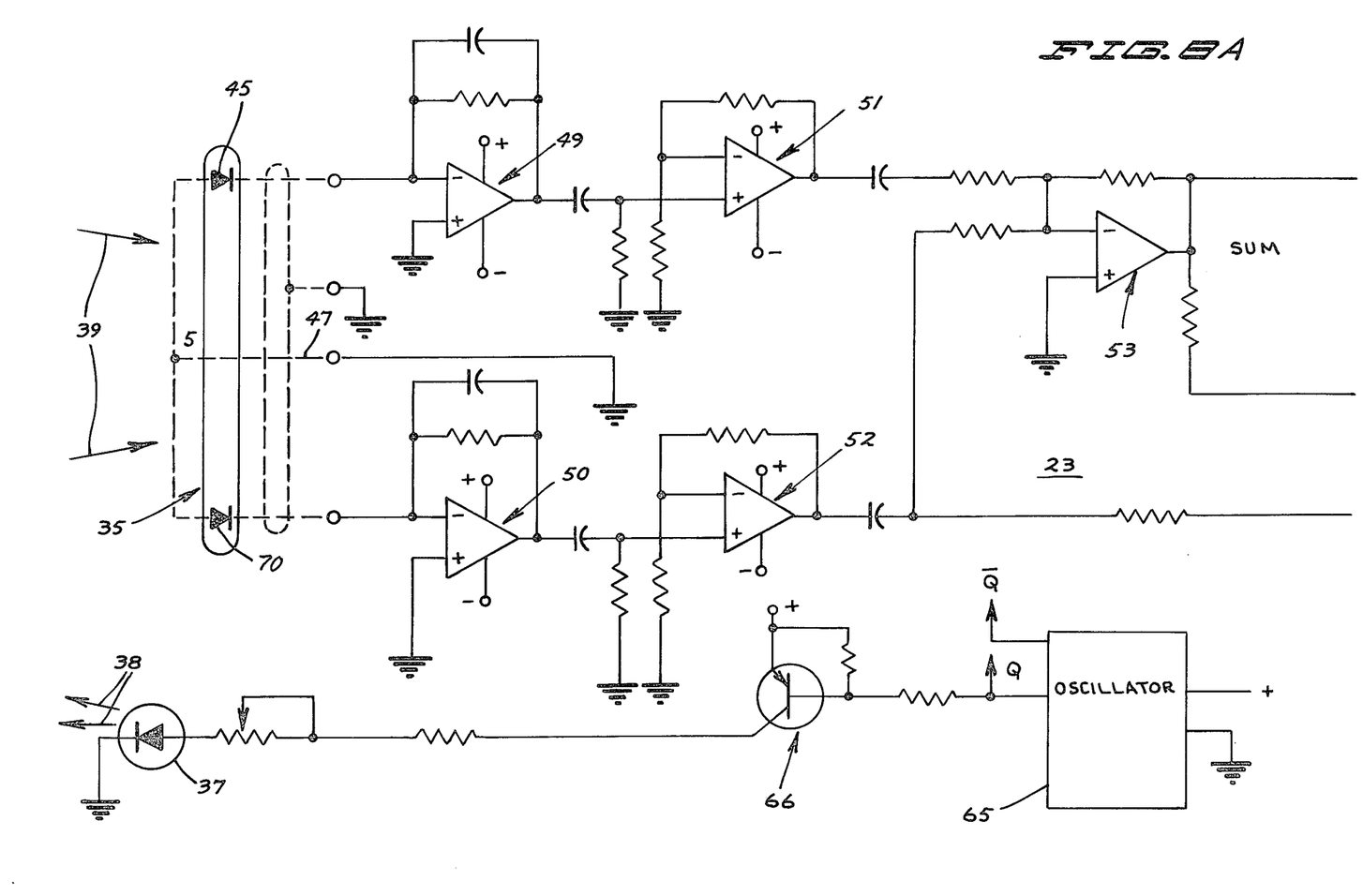

FIGS. 8A and 8B represent an electrical schematic diagram of the elements of an operative system embodying the principles of our invention. When assembled to form a single drawing with F. 8A on the left and FIG. 8B on the right, a complete system is shown in which a slightly divergent (2°) beam of radiant energy is emitted from a LED diode which may comprise source 37 as indicated by the dotted arrows, 38. A reflected beam of energy from planar mirror 19 is indicated by the dashed arrow 39 which are impingent upon the two diodes 45 and 70 comprising detector 35. LED 37 is shown energized through a transistor amplifier 66 from one or the other of the complimentary output terminals, Q and Q, of a square wave oscillator 65. Oscillator 65 may suitably be operated at a frequency of 1000 Hertz. The modulated beam of light 38 will be reflected from reflective surface 19 back to the individual diodes 45 and 70 of detector 35. The output from top diode 45 is amplified through amplifiers 49 and 51 and is applied to an input terminal of a summing amplifier 53. Similarly, the output of diode 70 is amplified in amplifiers 50 and 52 and is likewise applied to an input terminal of summing amplifier 53. The output of amplifier 53 represents the sum of the signals or potentials existing at diodes 45 and 70. The output of amplifier 53 is connected to an FET demodulator which may be energized from output terminal Q or Q on oscillator 65. The output of demodulator 58 is connected to amplifiers 59 and 60 and to an LED indicator 61. It may be noticed that a switch 63 is provided to vary the gain of amplifier 59 for varying distances between wheel head 26 and reflective surface 19. Switch 63 is intended to be operative simultaneously with switch 64 for this purpose. Indicator 61 will be energized whenever sufficient energy is received by either or both sections, 45 and 70, of detector 35 and is generally used by an operator to determine whether or not the system is operating within its normal range.

Amplifier 53 is connected to a further amplifier 54 which also receives an inut from amplifier 52. Amplifier 54 is operative as a summing amplifier and serves to substract the signal of diode 70 from the sum of the signals of diodes 45 and 70. The output of amplifier 54 is applied to the input of amplifier 68 and to the input of synchronous detectors FET 55. The output of synchronous detector FET 55 that is shown attached to the Q output terminal on oscillators 65 is connected to an input terminal on amplifier 56, the gain of which may be varied in accordance with the position of switch 64, referred to above. The output of amplifier 54 is also applied to the input of inverting amplifier 68 and to the input terminal of FET demodulator 69 which is connected to the Q terminal on oscillator 65. The output of demodulator 69 is also connected to the input terminal of amplifier 56 to provide a full wave operation to enhance the level of signal available to energize indicator 20. Indicator 20 may conveniently be comprised of a zero center meter or other device which will satisfactorily indicate a range of values proportional to the signal indicating the departure in a positive or negative sense form that which indicates that the particular component of the vehicle is in a desired predetermined attitude.

The specific electronic elements are intended to be illustrative only and the exact nature of the components is believed to be within the realm of one skilled in the art, for example, a number of the amplifier and other components may conveniently be contained within the confines of an integrated circuit assembly, or the like. Source 37 has been demonstrated to be operative using a commercially available LED manufactured by Spectronics and having a Type No. SE 3455-3.

In one operative embodiment of our system, an LED having a "window" in the magnitude of one-ten-thousandth of an inch was utilized to provide the source of radiant energy. Lens 40 had a diameter of 1.25 inches focal length of 4 inches while lens 41 had a focal length such as to provide the 2° divergence of the radiated rays 38, taking into account the presence of lens 40, its focal length and the relative dimensions of the other elements.

OPERATION OF THE ILLUSTRATED EMBODIMENT

In operation, the illustrated embodiment, when used to measure or adjust the attitude of the front wheels of a vehicle for toe-in, requires several calibrating steps. First, as indicated on FIG. 7 of the drawings, a vehicle (not shown) is positioned with its forewheels on a generally planar, horizontal work surface 10 and has front steerable wheels 11 and 12 positioned somewhat adjacent to a reflecting planar mirror 19. It will be seen that mirror 19 is rotatable about its vertical axis 20. The initial calibration consists in placing a wheel head 26 on one or both of the rear wheels with its calibrating end 42 adjusted for a zero departure from the axis of rotation of rear wheels 13 and 14 and with portion 29 directed forwardly toward mirror 19 so that the optical axis thereof is in a substantially horizontal plane, minor pitch errors 26 about its longitudinal axis may be readily be accommodated. This may be done through the use of the operator's sight sense or through the use of the gravity operated level which, when considered in connection with the relative orientation of the other elements of the system, will indicate that a horizontal attitude will produce the desired result. Under these conditions, when meter 20 reads zero, that is, neither positive nor negative deflection, the axis of rotation 18, of rear wheels 13 and 14 will be perpendicular to the longitudinal axis 15 of the vehicle (not shown). It may be seen that assuming mirror 19 retains a vertical attitude in which it is normal to the work surface 10, rotation about its vertical axis 20 will provide a position at which wheel head axes 27 and/or 28 are perpendicular or normal to the plane of mirror 19.

Once the initial calibration has been satisfactorily accomplished, the wheel head is moved to front wheel 11 or 12 and end portion 42, being provided with a calibrated mounting arrangement, may be set for a desired toe-in of either one of the front wheels. Under these circumstances, the longitudinal axis of wheel head 26 is offset from parallelism with the axis of rotation of the front wheels, 16 or 17. Thus, if the wheel is in proper alignment attitude, the radiated and reflected signal will indicate that optical axis 27 of wheel head 26 is in a perpenticular, or normal attitude with respect to mirror 19. Assuming that the axis of rotation of the wheel is not in such a predetermined position, meter 20 will read either a positive or negative departure from the desired attitude. This may be read directly or interpreted by an operator to determine the amount of adjustment that must be made to the running gear of the vehicle so as to place wheels 11 or 12 and their respective axes of rotation 17 or 16 in the predetermined desired attitude for proper toe-in relationship with longitudinal axis 15 of a vehicle.

It may be noted that front and rear switches 63 and 64 may be operated in accordance with the relative position of wheel head 26 with respect to the plane of mirror 19, it being understood that a greater signal and/or sensitivity is required for comparable operation when wheel head 26 is placed on one of the rear wheels of a vehicle than is needed when wheel head 26 is disposed on one of the front wheels of the vehicle.

I claim:

1. In apparatus of the class above described, the combination comprising:
   a. a level work surface for receiving a vehicle, components of which are to be aligned with respect to an axis of said vehicle;
   b. energy reflecting means positioned in a predetermined attitude to an axis of said vehicle;
   c. means, including a source of radiant energy and energy detecting means, said means adjustably disposed on a component of said vehicle, having an axis of which is to be positioned in predetermined relationship to an axis of said vehicle, said means having an optical axis to be adjustably disposed in predetermined relationship with the axis of said component and including an element which attaches to said vehicle component, a cylindrical outer tube disposed in said element and a lens means disposed adjacent to one end of said cylindrical outer tube to focus radiant energy returning from said energy reflecting means onto said energy detecting means disposed adjacent to the other end of said cylindrical outer tube and a coaxially disposed cylindrical inner tube disposed in said cylindrical outer tube carrying said source of radiant energy and said lens means also disposed adjacent to one end of said cylindrical inner tube to diverge a beam of radiant energy from said source of radiant energy located in said cylindrical inner tube whereby the energy radiated toward said energy reflecting means will be detected by said energy detecting means in a predetermined manner when the optical axis of said means is in a predetermined attitude with respect to the plane of said energy reflecting means, said source of radiant energy and said energy detecting means having coaxially effective axes of operation coincident with said optical axis.

2. The apparatus of claim 1 further comprising means to modulate said source of radiant energy.

3. The apparatus of claim 1 wherein said source of radiant energy comprises an infrared source of radiant energy.

4. The apparatus of claim 1 wherein said source of radiant energy comprises a light emitting infrared diode having a one-ten-thousandth of an inch radiant aperture window.

5. The apparatus of claim 1 wherein said source of radiant energy comprises a modulated source of infrared radiant energy.

6. The apparatus of claim 5 wherein said source of infrared radiant energy comprises a light emitting infrared diode having a one-ten-thousandth of an inch radiant aperture window.

7. The apparatus of claim 5 further comprising square wave modulation means to modulate said source of infrared radiant energy.

8. The apparatus of claim 7 wherein said modulation means comprises a one thousand hertz square wave oscillator.

9. The apparatus of claim 7 wherein said modulation means comprises a square wave oscillator having a frequency in the range of one thousand hertz.

10. The apparatus of claim 1 wherein said lens means provides divergence of a beam of radiant energy from said source of radiant energy so that said reflected beam of radiant energy from said energy reflecting means has divergence to fall within the limits of said outer cylindrical tube and said inner cylindrical tube.

11. The apparatus of claim 1 wherein said lens means has a first focal length to diverge a beam of radiant energy from said source of radiant energy and has a second focal length to focus a reflected beam of radiant energy from said energy reflecting means onto said energy detecting means.

12. The apparatus of claim 1 wherein said lens means comprises a first lens disposed adjacent to one end in said cylindrical outer tube and a second lens disposed adjacent to one end of said cylindrical inner tube.

13. The apparatus of claim 12 wherein said second lens cooperates with said first lens to provide a 2° divergence for the beam of radiant energy from said source of radiant energy.

14. The apparatus of claim 12 wherein said second lens provides a 2° divergence for the beam of radiant energy from said source of radiant energy.

15. The apparatus of claim 12 wherein said source of radiant energy is positioned ahead of the focal plane of said second lens to provide a slightly divergent beam of radiant energy.

16. The apparatus of claim 15 wherein said beam of radiant energy is diverged 2°.

17. The apparatus of claim 12 wherein said second lens comprises a biconvex lens to cooperate with said first lens to diverge the beam of said radiant energy.

18. The apparatus of claim 17 wherein said second lens comprises a biconvex lens to cooperate with said first lens to diverge the beam of said radiant energy with 2° of divergence.

19. The apparatus of claim 12 wherein said first lens comprises a biconvex lens to focus said radiant energy returning from said energy reflecting means onto said energy detecting means whereby the image appearing at said energy detecting means will be larger in size so as to provide a larger reflected image for coaction with said energy detecting means.

20. The apparatus of claim 12 further comprising a coaxially disposed central tube and spiders coaxially supporting said coaxially disposed central tube in said coaxially disposed cylindrical inner tube, said second lens disposed adjacent to one end in said coaxially disposed central tube to diverge the beam of radiant energy from said source of radiant energy located in said coaxially disposed central tube.

21. The apparatus of claim 1 wherein said energy detecting means comprises a base and light sensitive material disposed on two spaced discrete sections of said base for detecting the presence of said radiant energy.

22. The apparatus of claim 24 wherein said energy detecting means further comprises a multicell photodetector.

23. The apparatus of claim 1 further comprising an amplifier means connected to said source of radiant energy and a modulation means connected to said amplifier means whereby said square wave oscillator drives and modulates said source of radiant energy through said amplifier means.

24. The apparatus of claim 1 further comprising first summing means connected to each of said energy detecting means, first demodulator means connected to said first summing means, and first indicator means connected to said first demodulator means whereby said first indicator means indicate when said apparatus is operating within its normal range.

25. The apparatus of claim 24 further comprising oscillator means connected to said source of radiant energy and said first demodulator means, and a first means to control the gain of said signal from said first demodulator means whereby said first gain control means regulates the signal to said first indicator means to compensate for varying distances between said element and said energy reflecting means.

26. The apparatus of claim 24 wherein said first indicator means comprises light emitting diodes.

27. The apparatus of claim 26 further comprising oscillator means connected to said source of radiant energy and said first and second synchronous detectors, and a second means to control the gain of the signal from said first and second synchronous detector means whereby said second gain control means regulates the signal to said second indicator means to compensate for varying distances between said element and said energy reflecting means.

28. The apparatus of claim 26 wherein said second indicator means comprises a zero center meter.

29. The apparatus of claim 1 further comprising first summing means connected to each of said energy detecting means, second summing means connected to said first summing means and one of said energy detecting means, an inverting means connected to said said second summing means, first synchronous detector means connected to said inverting means, second synchronous detector means connected to said second summing means, and second indicator means connected to said first and second synchronous detector whereby said second indicator means indicates a positive or negative departure of the particular component of the vehicle from a predetermined attitude.

* * * * *